E. MANGISCH & A. REY.
COFFEE PERCOLATOR.
APPLICATION FILED AUG. 11, 1914.
1,160,924.
Patented Nov. 16, 1915.
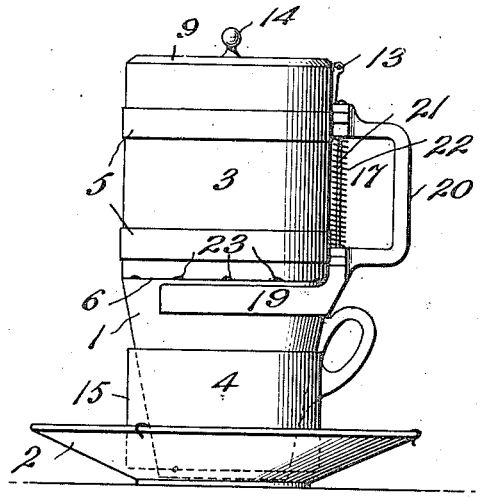
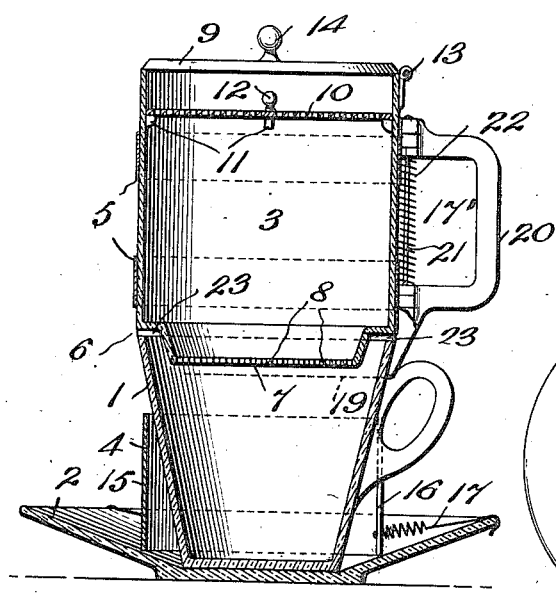
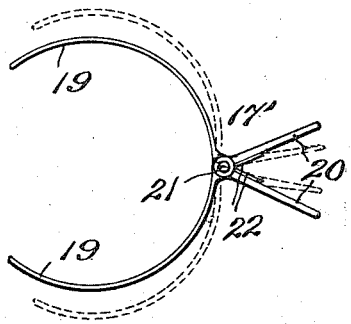
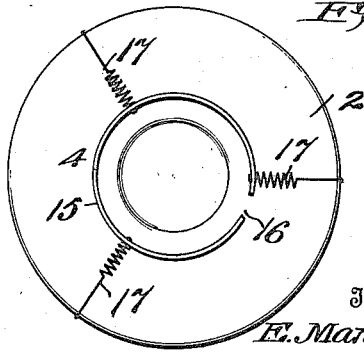
Witnesses
A. V. Doyle.
M. E. Laughlin
Inventors
E. Mangisch
A. Rey,
By Victor J. Evans
Attorney ding

UNITED STATES PATENT OFFICE.

EDWARD MANGISCH AND ANTHONY REY, OF NEW YORK, N. Y.

COFFEE-PERCOLATOR.

1,160,924.   Specification of Letters Patent.   Patented Nov. 16, 1915.

Application filed August 11, 1914. Serial No. 856,199.

*To all whom it may concern:*

Be it known that we, EDWARD MANGISCH and ANTHONY REY, citizens, respectively, of the United States and of the Republic of Switzerland, residing at New York, in the county of New York and State of New York, have invented new and useful Improvements in Coffee-Percolators, of which the following is a specification.

The general object of this invention is to admit of a person in a restaurant or public dining room making his own cup of coffee when desired so as to satisfy his own individual taste. And to this end the invention consists in providing a percolator adapted to be superimposed on the upper edge of a cup and providing a means adapted to be carried by the saucer for receiving the cup when the percolator is in position.

Other objects will appear and be better understood from that embodiment of our invention of which the following is a specification, reference being had to the accompanying drawings, forming part hereof, in which:—

Figure 1 is a side elevational view of the device shown adapted to use. Fig. 2 is a longitudinal sectional view of the parts shown in Fig. 1. Fig. 3 is a detail top plan view of the detachable handle, and Fig. 4 is a detail top plan view of a saucer showing the socket secured in position thereon.

Referring to the drawings in detail 1 designates a common form of coffee cup, 2 the common form of saucer therefor, 3 a coffee percolator superimposed on the cup and 4 a socket carried by the saucer and arranged for receiving the cup for preventing the tilting of the same when the percolator is in position.

The coffee percolator may be made in any shape desired and as shown is preferably formed of glass and reinforced by means of the metal bands 5. The bottom is constructed so as to provide an annular shouldered portion 6 and a restricted and downwardly extending portion 7 which is perforated as indicated at 8 to provide a strainer through which the coffee is filtered when the device is in use. Mounted within the percolator, adjacent to cover 9 thereof, is a second strainer 10. This strainer is arranged on the lugs 11 projecting from the inner wall of the percolator and is provided with a handle 12 for removing and replacing the same when desired.

The cover 9, as shown is hingedly connected to the percolator as at 13 and to provide a means for conveniently opening and closing the cover when desired the same is provided with a suitable handle 14.

The socket 4 carried by the saucer is preferably formed of a resilient sheet metal band 15 and is split as at 16 so as to provide an opening for accommodating the handle of the cup when the cup is placed therein. Means in the form of a plurality of resilient stays 17 are provided for attaching the socket to the saucer and for yieldingly holding the same in the central portion thereof. These stays are in the form of spring wire hooks which are connected at one end to the side of the metal band and have their other or hooked ends engaged with the edge of the saucer. It is obvious that by forming the stays in the above mentioned manner the socket may be readily attached and detached from the saucer when desired.

To provide a means for conveniently handling both the cup and percolator when the percolator has been superimposed on the cup a handle 17' is provided. This handle is preferably formed of the shape shown and comprises a pair of oppositely disposed members on the lower ends of which are formed the jaw portions 19 and on the upper ends of which are formed the hand gripping portions 20. A pin 21 pivotally connects the two members together and a coil spring 22 surrounds the pin and is provided for normally retaining the jaws in their closed position.

In use and obviously when the cup has been placed within the socket and the percolator superimposed upon the cup the cover 9 of the percolator is opened and the strainer 10 is removed. A sufficient quantity of ground coffee to make a cup of coffee is then placed within the percolator and the strainer 10 is then replaced. Boiling water is then poured into the percolator, the strainer effecting the spraying of the same over the entire mass of ground coffee. The water then percolates through the coffee into the cup and to permit the escape of air therein as the cup is being filled a series of notches 23 is provided on and arranged around the annular shouldered portion of the percolator as shown. After a cup of coffee has been made the handle 17' may then be used for removing the cup and the percolator from the socket so that the socket can be removed from the saucer and the cup placed therein. The handle may then be detached from the cup and utilized for removing the percolator from the cup.

It is obvious that those skilled in the art may vary the details of construction and arrangements of parts without departing from the spirit of our invention and therefore we do not wish to be limited to such features except as may be required by the claims.

What we claim as new is:—

1. In combination with a cup and a percolator, a handle adapted to detachably engage the cup and percolator and hold them together.

2. In combination with a cup and a percolator, a handle consisting of members hingedly connected together and adapted to engage the cup and percolator and hold them together.

In testimony whereof we affix our signatures in presence of two witnesses.

EDWARD MANGISCH.
ANTHONY REY.

Witnesses:
GEO. A. BYRNE,
M. E. LAUGHLIN.